UNITED STATES PATENT OFFICE.

VAN CLEAVE ALBERT PARROTT, OF SUMTER, SOUTH CAROLINA.

FOOD PRODUCT AND METHOD OF MAKING THE SAME.

1,154,721.

Specification of Letters Patent. Patented Sept. 28, 1915.

No Drawing. Application filed October 6, 1914. Serial No. 865,318.

*To all whom it may concern:*

Be it known that I, VAN CLEAVE ALBERT PARROTT, a citizen of the United States, residing at Sumter, in the county of Sumter and State of South Carolina, have invented certain new and useful Improvements in Food Products and Methods of Making the Same, of which the following is a specification.

My invention relates to a food product commonly termed a mayonnaise dressing. At present, such dressings consist of a combination of the yolk of eggs and eatable oil, lemon juice or a suitable acid, and seasoning, and such products must be used practically as soon as made, it being impossible to bottle or otherwise preserve them, owing to the fact that the egg will separate from the other ingredients and spoil.

My invention consists in combining the eggs and oil and adding the resultant mixture to gelatin, which holds the eggs in emulsion, thereby preventing them from separating from the other ingredients. I find that the addition of the gelatin does not affect the palatability of the food product, and at the same time prevents the eggs from separating out of the mixture and spoiling.

A mayonnaise dressing made in accordance with my invention may be bottled or canned, and will keep indefinitely and may therefore be put up in quantities and sold as a manufactured product.

To carry out my invention, I add to the yolk of one egg, slowly beating all the while, approximately one-half pint of an eatable oil. To the resultant mixture I add a solution of citric acid or juice of lemon to taste. To this mixture is added sufficient unflavored gelatin to hold the egg and oil in emulsion, the entire mass being beaten or stirred together to the proper consistency. To the foregoing mixture I add one-tenth of 1% of benzoate of soda.

The final food product obtained by mixing the foregoing food stuffs according to the method described is a smooth mayonnaise dressing, free from lumps, and indistinguishable in taste from such dressings as heretofore compounded without the gelatin, and adapted to be bottled and kept indefinitely.

While I have described certain definite proportions of egg and oil, it will be understood that the scope of my invention covers all possible variations in combination with the gelatin as before mentioned, for I do not restrict myself to any specific percentages or proportions, the above being cited merely as an example to aid in the understanding of the invention, which consists broadly in the addition of gelatin to a dressing containing oil and eggs, for the purpose of keeping the latter in emulsion.

Having thus described my invention, I claim:

1. A food product containing eggs, eatable oil and gelatin, and in which the eggs are held in emulsion in said gelatin.

2. The herein described process of preparing a food product consisting of combining the yolk of eggs with an eatable oil, and combining the resultant mixture with sufficient gelatin to form an emulsion.

3. A food product comprising an egg ingredient and an eatable oil in combination with an acid, a preservative, and gelatin.

4. A mayonnaise dressing containing eggs, oil and gelatin, the oil content of which dressing being in the approximate ratio of one-half pint of oil to each egg.

In testimony whereof I hereunto affix my signature in the presence of two witnesses.

VAN CLEAVE ALBERT PARROTT.

Witnesses:
E. H. RHOME,
H. R. VAN DEVENTER.